(12) United States Patent
Oonishi

(10) Patent No.: US 10,037,021 B2
(45) Date of Patent: Jul. 31, 2018

(54) NUMERICAL CONTROLLER PERFORMING SPEED CONTROL WITH CURVATURE AND CURVATURE CHANGE AMOUNT

(71) Applicant: FANUC CORPORATION, Minamitsuru-gun, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 17 days.

(21) Appl. No.: 15/337,511

(22) Filed: Oct. 28, 2016

(65) Prior Publication Data

US 2017/0123409 A1    May 4, 2017

(30) Foreign Application Priority Data

Oct. 30, 2015 (JP) .................................. 2015-214317

(51) Int. Cl.
*G05B 19/416* (2006.01)

(52) U.S. Cl.
CPC .. *G05B 19/416* (2013.01); *G05B 2219/34169* (2013.01)

(58) Field of Classification Search
CPC ................... G05B 19/416; G05B 2219/34169
See application file for complete search history.

(56) References Cited

U.S. PATENT DOCUMENTS

| | | | | |
|---|---|---|---|---|
| 5,847,960 A * | 12/1998 | Cutler | ................... | B23K 26/08 700/186 |
| 6,591,158 B1 * | 7/2003 | Bieterman | ............. | G05B 19/41 700/169 |
| 9,280,150 B2 * | 3/2016 | Sato | ................... | G05B 19/4166 |
| 9,815,125 B2 * | 11/2017 | Uenishi | ..................... | B23C 1/14 |
| 2003/0118416 A1 | 6/2003 | Murakami et al. | | |
| 2009/0248203 A1 * | 10/2009 | Nakamura | ......... | G05B 19/4103 700/251 |
| 2012/0221141 A1 * | 8/2012 | Otsuki | .................. | G05B 19/41 700/189 |

(Continued)

FOREIGN PATENT DOCUMENTS

JP    H 02219107 A    8/1990
JP    H05143146 A    6/1993

(Continued)

OTHER PUBLICATIONS

Japanese Office Action for Japanese Application No. 2015-214317, dated Nov. 6, 2017, including Concise Statement of Relevance of Office Action, 6 pages.

(Continued)

*Primary Examiner* — Ramesh Patel

(74) *Attorney, Agent, or Firm* — RatnerPrestia

(57) ABSTRACT

A numerical controller which controls a machine tool on the basis of a program instruction analyzes the program instruction to generate movement instruction data, and sets a value of a constant used for speed change on the basis of a physical amount regarding a curvature at a current position on a movement path based on the generated movement instruction data. Then, the numerical controller calculates movement speeds of axes of the machine tool using the set value of the constant used for the speed change, and controls the axes on the basis of the calculated movement speeds.

4 Claims, 8 Drawing Sheets

(56) References Cited

U.S. PATENT DOCUMENTS

| | | | | |
|---|---|---|---|---|
| 2012/0283851 A1* | 11/2012 | Yamamoto | ............ | G05B 19/19 |
| | | | | 700/56 |
| 2013/0116816 A1* | 5/2013 | Otsuki | ................ | G05B 19/416 |
| | | | | 700/159 |
| 2013/0245995 A1* | 9/2013 | Otsuki | ............... | B23Q 17/0995 |
| | | | | 702/155 |

FOREIGN PATENT DOCUMENTS

| | | |
|---|---|---|
| JP | H 05313729 A | 11/1993 |
| JP | H07064620 A | 3/1995 |
| JP | 2003108210 A | 4/2003 |
| JP | 2007233613 A | 9/2007 |
| JP | 2010267169 A | 11/2010 |

OTHER PUBLICATIONS

Decision to Grant a Patent for Japanese Application No. 2015-214317, dated Mar. 13, 2018, including English translation, 6 pages.

* cited by examiner

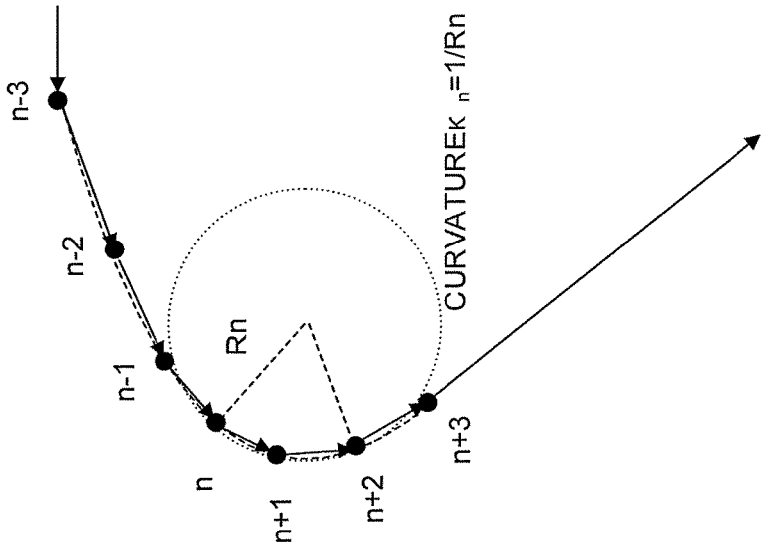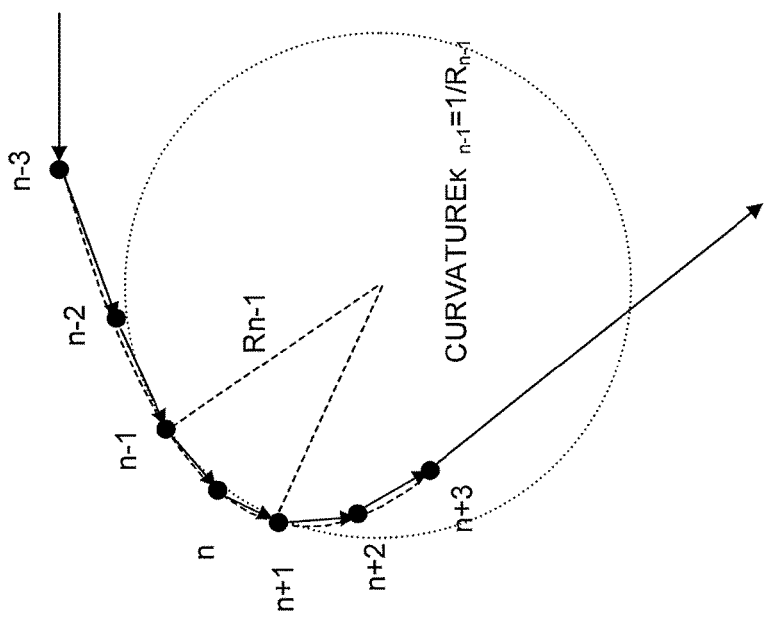

THREE INSTRUCTION POINTS

FOUR INSTRUCTION POINTS

NUMERICAL CONTROLLER PERFORMING SPEED CONTROL WITH CURVATURE AND CURVATURE CHANGE AMOUNT

BACKGROUND OF THE INVENTION

Field of the Invention

The present invention relates to a numerical controller, and in particular, relates to a numerical controller which enables optimum speed control in accordance with a shape of a movement path.

Description of the Related Art

In control of a machine by a numerical controller, allowable accelerations are generally set with respect to axes included in the machine. In a case where a driving target is moved along a movement path of a curved shape and a corner shape, control is performed such that movement occurs at the highest speed within a range in which an acceleration does not exceed the allowable acceleration when the movement direction is changed.

FIG. 7 is a diagram for illustrating an example of conventional speed control in consideration of the allowable acceleration.

When the driving target such as a tool included in the machine is being moved at a movement speed v along a movement path indicated by the solid arrows, accelerations $ax_n$ and $ay_n$ have to be increased in the case where the speed v is increased in order to change the movement direction at point n along the movement path, where the acceleration in the X-axis direction is $ax_n$ and the acceleration in the Y-axis direction is $ay_n$ at point n on the movement path. Nevertheless, the acceleration $ax_n$ is restricted by the allowable acceleration of the X axis, and moreover, the acceleration $ay_n$ is restricted by the allowable acceleration of the Y axis. Therefore, as the movement speed v of the driving target, the highest speed is set within a range in which the accelerations $ax_n$ and $ay_n$ needed for changing the movement direction at point n do not exceed the respective allowable accelerations of the axes.

Moreover, when the driving target of the machine is moved, the speed can be set to be constant regardless of the movement direction.

As a conventional technique regarding such speed control on a movement path of a curved shape and a corner shape, for example, Japanese Patent Application Laid-Open No. 2-219107 discloses a speed control method of determining the speed from a curvature on an arc-shaped movement path or from a normal direction acceleration thereon.

Moreover, in Japanese Patent Application Laid-Open No. 05-313729, there is known a technique of automatically determining a corner shape between blocks in performing numerical control to perform in-position check even when an exact stop instruction (G09) or the like is not instructed in a machining program. In this technique, a corner angle α formed between a unit vector of a first block and a unit vector of a second block is calculated, determination is made as to whether a corner error due to a servo control delay exceeds an allowable range on the basis of the calculated corner angle α, and when it is determined that the allowable range is exceeded, in-position check is instructed to be performed on data of the first block to keep within the allowable range.

In the numerical controller, as a value used for deriving the speed of the driving target in speed control, a constant value is set, such as a normal direction acceleration, an allowable inward turning amount in consideration of post-interpolation acceleration and deceleration, and an in-position width. When only one value can be set for each of such constant values, an operator has to confirm the movement path of the driving target before starting machining, and to set each constant value to meet the point at which deceleration is most needed on the movement path, that is, the point with the most severe condition. However, in the case of such configuration, there arises a problem of a decrease in the speed of the whole machining, which causes a long cycle time.

Moreover, when machining is performed using a machining program constituted of minute line segments, as shown in FIG. 8A and FIG. 8B, since even the same shapes result in different angles between blocks depending on the number of instruction points (three points in the example of FIG. 8A; four points in the example of FIG. 8B), there arises a problem of difficulty to determine the shape in excellent precision.

SUMMARY OF THE INVENTION

Therefore, an object of the present invention is to provide a numerical controller which enables optimum speed control in accordance with a shape of a movement path.

In the present invention, the aforementioned problems are solved by using a function of properly using one of constant values used for speed calculation on the basis of determination using at least any of a curvature and a curvature change amount in executing a machining program. Moreover, the speed is made smoothly switched, so that discontinuity does not arise at the border of the determination when the constant values used for speed calculation are chosen.

In general, since a portion of an edge shape (acute curved shape or corner shape) has a large curvature change and often takes small curvatures therearound, this tendency is reflected on the determination. In spite of a difference in precision depending on excellence of the machining program, the curvature does not depend on fineness of the instruction points. Hence, as compared with the determination by the angle used in the technique disclosed in Japanese Patent Application Laid-Open No. 05-313729 mentioned above, this determination made with the curvature and/or the curvature change amount can achieve determination of the edge shape with higher precision.

A numerical controller according to the present invention controls, on the basis of a program instruction, a machine that machines a workpiece by driving a plurality of axes to move a tool and the workpiece relative to each other. The numerical controller includes an instruction analysis unit that analyzes the program instruction to generate movement instruction data; a speed control determination unit that sets a value of a constant used for speed change on the basis of a physical amount regarding a curvature at a current position on a movement path based on the movement instruction data; and a speed calculation unit that calculates movement speeds of the axes using the value of a constant used for speed change, which is set by the speed control determination unit. Further, the numerical controller is configured to control the axes on the basis of the movement speeds calculated by the speed calculation unit.

The speed control determination unit may be configured to set the value of the constant used for the speed change on the basis of a curvature change amount at the current position on the movement path, or be configured to make the configuration on the basis of relation between the curvature and the curvature change amount at the current position on the movement path, or moreover, may be configured to set the value of the constant used for the speed change such that the constant takes a value continuous with respect to change in value of the physical amount regarding the curvature.

According to the present invention, a portion with a severe condition can be prevented from making whole speed limitation severe, and as compared with conventional one, the cycle time can be reduced. Moreover, comparing machining with the same cycle times before and after applying the present invention with each other, since the present invention enables severe speed limitation to be applied to a portion of an edge shape and loose speed limitation to be applied to a portion of a moderate curved shape, precision can be selectively enhanced only at a needed place.

BRIEF DESCRIPTION OF THE DRAWINGS

The aforementioned and other objects and features of the present invention will be more apparent from the following description of embodiments with reference to the accompanying drawings, in which:

FIG. 1 is a diagram showing an example of a method of deriving a curvature and a curvature change amount;

DETAILED DESCRIPTION OF THE PREFERRED EMBODIMENTS

The present invention provides, to a numerical controller, a function of properly using one of constant values used for speed calculation depending on determination using at least any of a curvature and a curvature change amount in executing a machining program. For example, there is provided means for automatically discriminating only an edge shaped portion to a limited extent to decelerate when a minute line segment program outputted from a CAM based on CAD shape data having the edge shape is executed.

FIG. 1 is a diagram showing an example of a method of deriving a curvature and a curvature change amount.

As a method of deriving the curvature, there is a method of obtaining, in line segment vector data constituting a machining path, a curvature $\kappa_n$ of an arc passing through three points of the start point of block n, the end point of block n (start point of block (n+1)) and the end point of block (n+1) with respect to two blocks of block n and block (n+1), and presuming the curvature $\kappa_n$ as the curvature from block n to block (n+1). Moreover, as shown in FIG. 1, the curvature change amount $\kappa v_n$ in block n can be defined as the difference between the curvature $\kappa_{n-1}$ from block (n-1) to block n and the curvature $\kappa_n$ from block n to block (n+1). Note that the method of deriving the curvature and the curvature change amount is not limited to the above but various deriving methods can be employed.

Examples of the constant values used for speed calculation include a normal direction acceleration, an allowable inward turning amount in consideration of post-interpolation acceleration and deceleration, an in-position width, and the like. In the present invention, which one of those constant values is to be used for speed calculation is not specially limited. Moreover, any constant value other than the above can also be used as long as it is a constant value that can be used for speed calculation.

A first embodiment of a numerical controller according to the present invention is described using FIGS. 2A to 2C and FIG. 3.

The numerical controller of this embodiment has a function of properly using one of constant values used for speed calculation on the basis of determination by the curvature change amount. Note that the present embodiment is described using an example in which an allowable inward turning amount in consideration of post-interpolation acceleration and deceleration, which is a constant value used for speed calculation, is properly used.

Figure 2A:
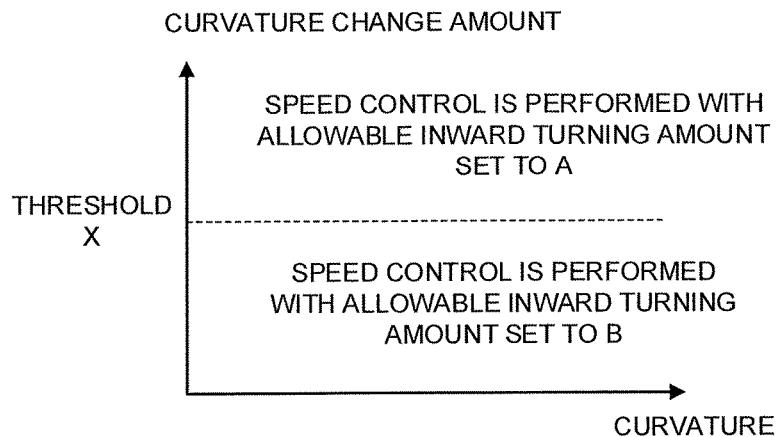
FIGS. 2A to 2C are diagrams for illustrating proper use of constant values used for speed calculation by a numerical controller according to a first embodiment of the present invention.
Figure 2B:
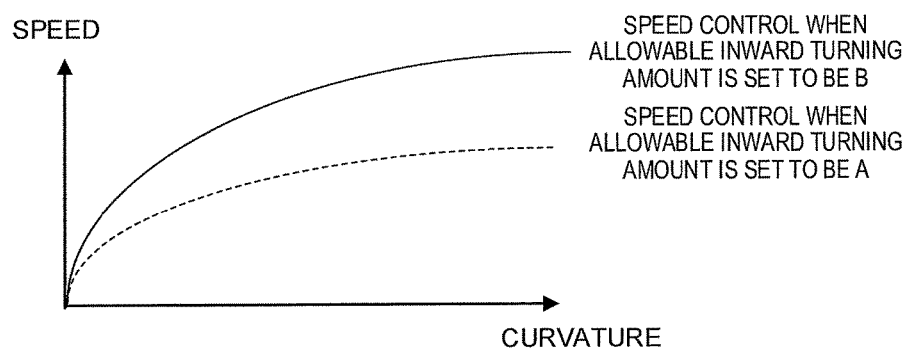
Figure 2C:
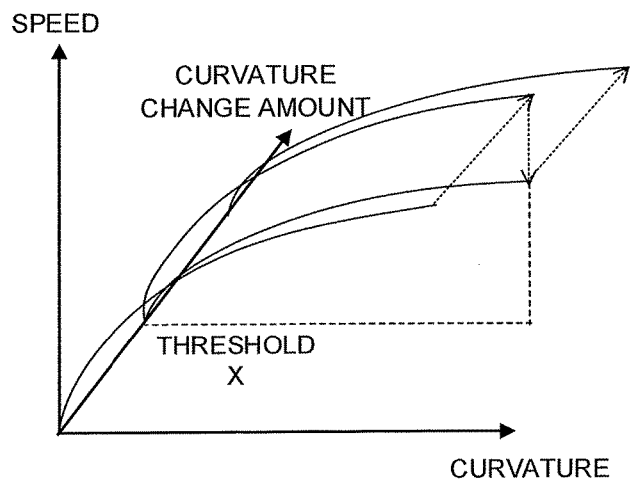

Therefore, proper use of the constant values used for speed calculation of the present embodiment is described using FIG. 2A to FIG. 2C.

The numerical controller of the present embodiment is configured to obtain, in controlling a driving target of the machine, a curvature and a curvature change amount on a movement path of the driving target, and to change, when the obtained curvature change amount exceeds a predefined predetermined threshold, the allowable inward turning amount which is the constant value used for speed calculation.

FIG. 2A shows an example of properly using an allowable inward turning amount A or an allowable inward turning amount B with a threshold X of the curvature change amount being the border. When the allowable inward turning amount A and the allowable inward turning amount B are respectively set as shown in FIG. 2A, the speed with respect to the curvature is controlled as shown in FIG. 2B. In FIG. 2B, the dotted curve indicates relation of the speed with respect to the curvature in the case where the allowable inward turning amount is A, and the solid curve indicates relation of the speed with respect to the curvature in the case where the allowable inward turning amount is B.

FIG. 2C shows a three-dimensional graph of relation between the curvature, the curvature change amount and the speed according to the present embodiment on the basis of the aforementioned proper use. As shown in FIG. 2C, the value of the allowable inward turning amount is changed from B to A with the threshold X of the curvature change amount being the border, and control of the speed with respect to the curvature is changed.

Figure 3:
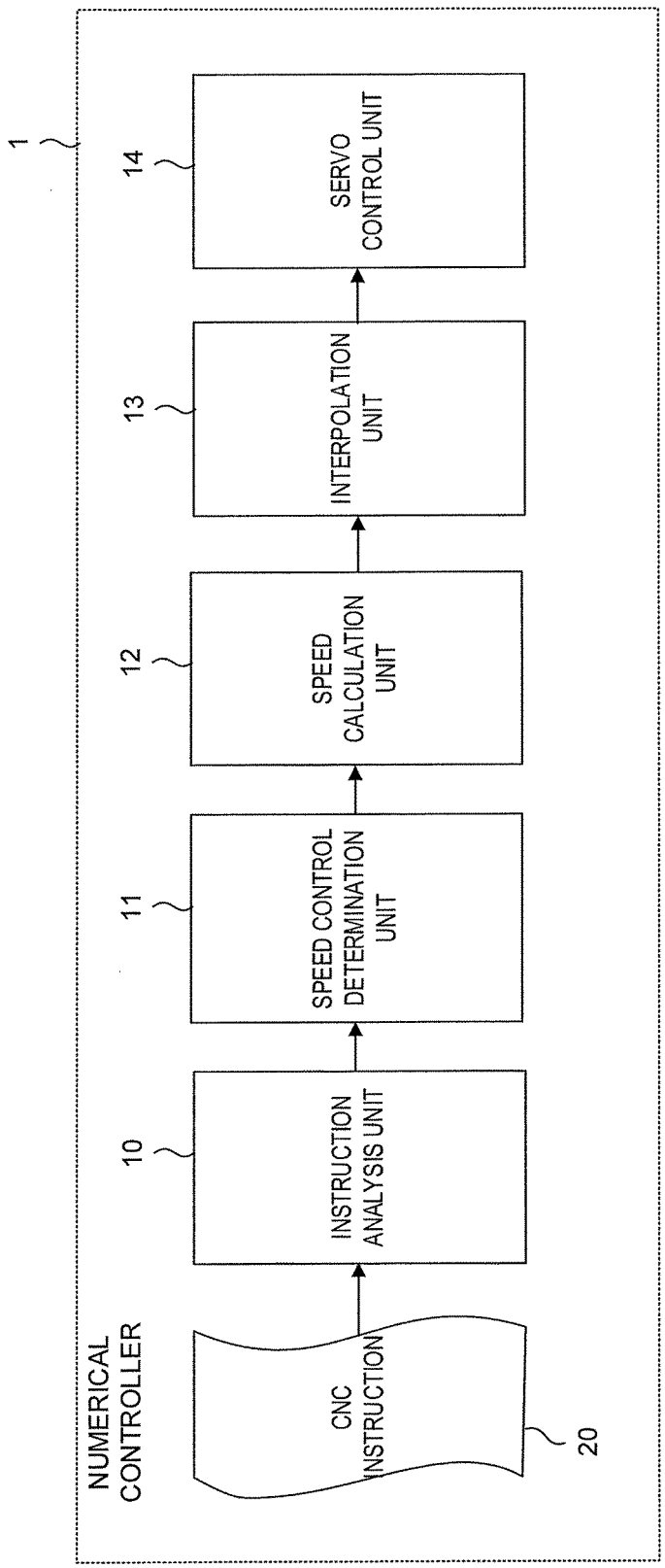
FIG. 3 is a functional block diagram of the numerical controller according to the first embodiment of the present invention.

FIG. 3 shows a functional block diagram of a numerical controller according to an embodiment of the present invention.

A numerical controller 1 of the present embodiment includes an instruction analysis unit 10, a speed control determination unit 11, a speed calculation unit 12, an interpolation unit 13 and a servo control unit 14.

The instruction analysis unit 10 sequentially prefetches and analyzes CNC instructions 20 from a program and the like stored in a memory (not shown), creates instruction data for instructing movements of the axes on the basis of the analysis result, and outputs the created movement instruction data to the speed control determination unit 11.

The speed control determination unit 11 calculates the curvature at the start point of each block on the movement path on the basis of the movement instruction data received from the instruction analysis unit 10, further calculates the curvature change amount from the curvature of each block and the curvature of the block previous to this block, and determines whether the calculated curvature change amount exceeds or goes below a certain threshold X. Then, on the basis of the determination result, the speed control determination unit 11 sets a constant value of a constant that is used for speed control and is used in the speed calculation unit 12 mentioned later. For example, when the curvature change amount exceeds the threshold X, the constant value of the inward turning amount which is the constant used for speed control is set to be A, and on the other hand, when the curvature change amount goes below the threshold X, the constant value of the inward turning amount which is the constant used for speed control is set to be B. Note that which of the inward turning amount A and the inward turning amount B is to be used when the curvature change amount and the threshold X have the same value may be defined depending on designing, and the effect of the present invention can be obtained in any case of use of any value of those.

The speed calculation unit 12 determines the speed such that the inward turning amount in consideration of post-interpolation acceleration and deceleration is constant. The speed calculation unit 12 uses the constant value set by the speed control determination unit 11, calculates the speed such that the inward turning amount is constant to be A when the curvature change amount exceeds the threshold X, and calculates the speed such that the inward turning amount is constant to be B when the curvature change amount goes below the threshold X.

The interpolation unit 13 interpolates and calculates points on the instruction path instructed by the movement instruction data at interpolation intervals on the basis of the speed determined by the speed calculation unit 12, and generates interpolation data. Moreover, the interpolation unit 13 performs post-interpolation acceleration and deceleration processing on the generated interpolation data to calculate the speed of each drive axis at each interpolation interval, and outputs the calculation result to the servo control unit 14.

Then, the servo control unit 14 controls drive parts of the axes of the machine as the controlling targets, based on the output of the interpolation unit 13.

Note that, in the above description, switching is performed using one threshold X, however, alternatively, a plurality of thresholds $X_1$, $X_2$, . . . may be beforehand set and, on the basis of which one of a plurality of value ranges defined by the set plurality of thresholds the curvature change amount falls within, the constant to be used for speed control may be properly used in multiple stages. Moreover, a function for calculating the constant used for speed control from the curvature change amount may be used. Furthermore, these may be combined to define functions for calculating the constant used for speed control from the curvature change amounts with respect to value ranges defined by the thresholds, and to properly use one of the functions on the basis of which of the value ranges defined by the thresholds the curvature change amount falls within, thereby calculating the constant used for speed control from the curvature change amount.

With the numerical controller 1 of the present embodiment including the aforementioned configuration, a portion with a severe condition can be prevented from making whole speed limitation severe, and as compared with conventional one, the cycle time can be reduced. Moreover, as compared with machining operation with the same cycle time, since severe speed limitation can be applied to a portion of an edge shape and loose speed limitation can be applied to a portion of a moderate curved shape, precision can be selectively enhanced only at a needed place.

Figure 4A:
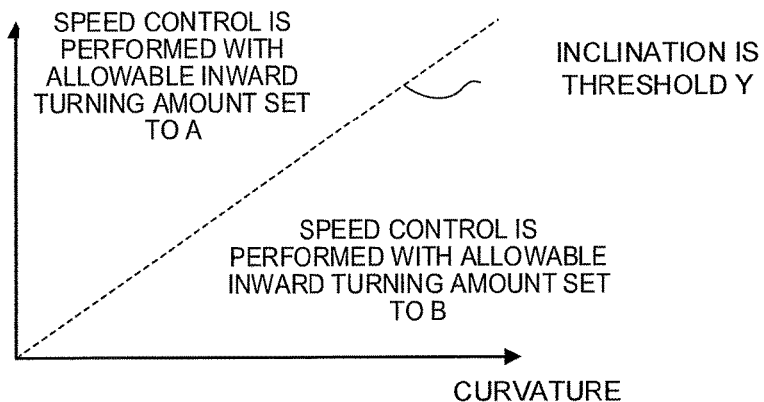
FIGS. 4A to 4C are diagrams for illustrating proper use of the constant values used for speed calculation by a numerical controller according to a second embodiment of the present invention.
Figure 4B:
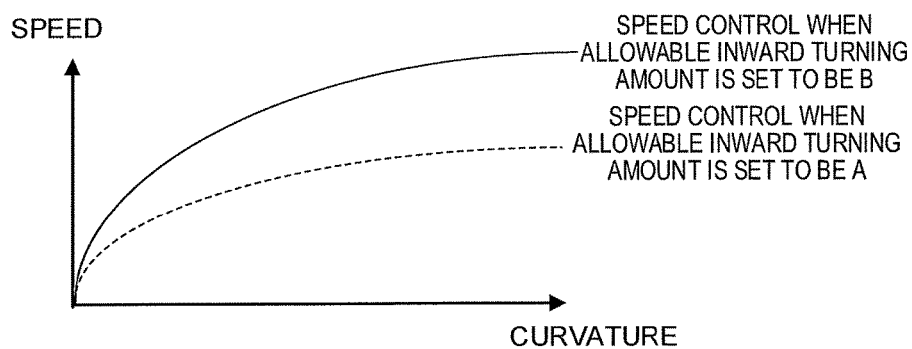
Figure 4C:
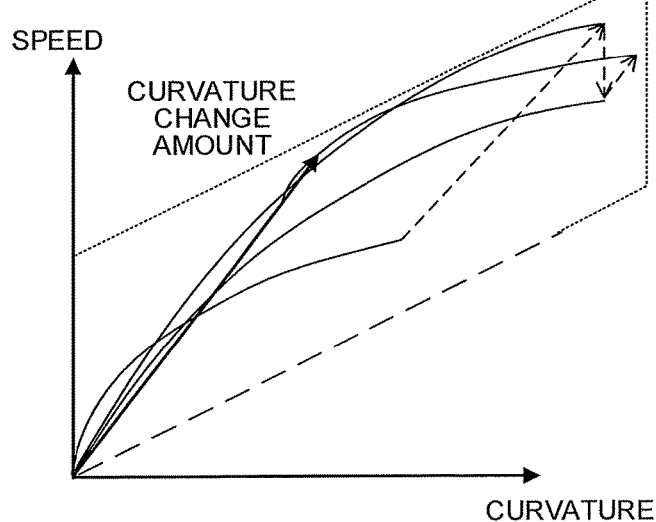

Next, a second embodiment of the numerical controller according to the present invention is described using FIGS. 4A to 4C.

The aforementioned numerical controller of the first embodiment includes the function of properly using one of the constant values used for speed calculation on the basis of determination by the curvature change amount. On the contrary, the numerical controller of the present embodiment includes a function of properly using one of the constant values used for speed calculation on the basis of determination by relation between the curvature and the curvature change amount. Note that the present embodiment is described using an example in which an allowable inward turning amount in consideration of post-interpolation acceleration and deceleration, which is a constant value used for speed calculation, is properly used.

Therefore, proper use of the constant values used for speed calculation of the present embodiment is described using FIG. 4A to FIG. 4C.

The numerical controller of the present embodiment is configured to obtain, in controlling a driving target of the machine, a curvature and a curvature change amount on a movement path of the driving target, and to change, when a ratio of the curvature change amount to the curvature exceeds a predefined predetermined threshold, the allowable inward turning amount which is the constant value used for speed calculation.

FIG. 4A shows an example of proper use in which the allowable inward turning amount is set to be A when the ratio (inclination) of the curvature change amount relative to the curvature exceeds a threshold Y, and the allowable inward turning amount is set to be B when it goes below the threshold Y. When the allowable inward turning amount A and the allowable inward turning amount B are respectively set as shown in FIG. 4A, the speed with respect to the curvature is controlled as shown in FIG. 4B. In FIG. 4B, the dotted curve indicates relation of the speed with respect to the curvature in the case where the allowable inward turning amount is A, and the solid curve indicates relation of the speed with respect to the curvature in the case where the allowable inward turning amount is B.

FIG. 4C shows a three-dimensional graph of relation between the curvature, the curvature change amount and the speed according to the present embodiment on the basis of the aforementioned proper use.

While a functional block diagram of the numerical controller according to the present embodiment is similar to that in FIG. 3 (first embodiment), in the present embodiment, the contents of processing performed by the speed control determination unit 11 and the speed calculation unit 12 are different from those in the first embodiment.

The speed control determination unit 11 calculates the curvature at the start point of each block on the movement path on the basis of the movement instruction data received from the instruction analysis unit 10, further calculates the curvature change amount from the curvature of each block and the curvature at the start point of the block previous to this block, and determines whether the ratio of the calculated curvature change amount to the calculated curvature exceeds or goes below a certain threshold Y.

Then, a constant value of a constant that is used for speed control and is used in the speed calculation unit 12 is set on the basis of the determination result. For example, when the ratio of the curvature change amount to the curvature exceeds the threshold Y, the constant value of the inward turning amount, which is the constant used for speed control, is set to be A, and on the other hand, when the ratio of the curvature change amount to the curvature goes below the threshold Y, the constant value of the inward turning amount, which is the constant used for speed control, is set to be B. Note that which of the inward turning amount A and the inward turning amount B is to be used when the ratio of the curvature change amount to the curvature and the threshold Y have the same value may be defined depending on designing, and the effect of the present invention can be obtained in any case of use of any value of those.

The speed calculation unit 12 determines the speed such that the inward turning amount in consideration of post-interpolation acceleration and deceleration is constant, similarly to the speed calculation unit 12 in the first embodiment. In so doing, the speed calculation unit uses the constant value set by the speed control determination unit 11, calculates the speed such that the inward turning amount is constant to be A when the ratio of the curvature change amount to the curvature exceeds the threshold Y, and calculates the speed such that the inward turning amount is constant to be B when the ratio of the curvature change amount to the curvature goes below the threshold Y.

Note that, in the above description, switching is performed using one threshold Y, however, alternatively, similarly to the first embodiment, a technique of using a plurality of thresholds $Y_1$, $Y_2$, ... may be used. Moreover, in the above description, an example in which the ratio of the curvature change amount to the curvature is used as the relation between the curvature and the curvature change amount is presented, but without being restricted to this, any determination technique determined depending on relation between the curvature and the curvature change amount may be used for determination of proper use of the constant value used for speed control, by using a ratio of a product value of the curvature change amount to the curvature or by setting and determining thresholds for the curvature and the curvature change amount, respectively. Furthermore, a function for calculating a constant used for speed control from the curvature and the curvature change amount may be used, or a constant used for speed control may be obtained in combination of those methods.

With the numerical controller 1 of the present embodiment including the aforementioned configuration, a portion with a severe condition can be prevented from making whole speed limitation severe, and as compared with conventional one, the cycle time can be reduced. Moreover, as compared with machining operation with the same cycle time, since severe speed limitation can be applied to a portion of an edge shape and loose speed limitation can be applied to a portion of a moderate curved shape, precision can be selectively enhanced only at a needed place.

Next, a third embodiment of the numerical controller according to the present invention is described using FIGS. 5A to 5C and FIGS. 6A and 6B.

In the aforementioned first embodiment and second embodiment, determination is performed on the basis of the curvature change amount or on the basis of relation between the curvature and the curvature change amount, and on the basis of the determination result, the constant values of the constants used for speed calculation are chosen. However, when the constant values used for speed control are suddenly switched in switching the constant values on the basis of the determination, machining can be affected at the discontinuous point of the constant value used for speed calculation in switching or in a portion where the curvature change amount or the curvature change amount relative to the curvature repeatedly exceeds and goes below the threshold.

Therefore, in the present embodiment, the constant value of the constant used for speed calculation is configured to take a value as continuous as possible such that it is not discontinuous, with respect to the curvature change amount or the change in curvature change amount relative to the curvature. Below, a case of linearly connecting the constant values used for speed calculation is described as an example. Note that in the present embodiment, description is made using an example of properly using one of the allowable inward turning amounts in consideration of post-interpolation acceleration and deceleration, which are the constant values used for speed calculation.

FIG. 5A to FIG. 5C, and FIG. 6A and FIG. 6B are diagrams for illustrating proper use of the constant values used for speed calculation of the present embodiment.

In the present embodiment, a connection range D is defined for continuously changing the allowable inward turning amount in consideration of post-interpolation acceleration and deceleration, which is the constant value used for speed calculation, above and below the threshold of the curvature change amount or the ratio of the curvature change amount to the curvature, and within this range, the allowable inward turning amount in consideration of post-interpolation acceleration and deceleration used for speed control is linearly changed from A to B.

Figure 5A:
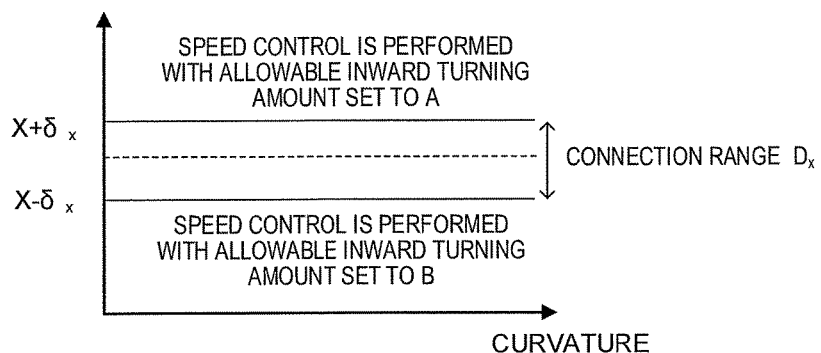
FIGS. 5A to 5C are diagrams for illustrating proper use of the constant values used for speed calculation with the curvature change amount by a numerical controller according to a third embodiment of the present invention.
Figure 5B:
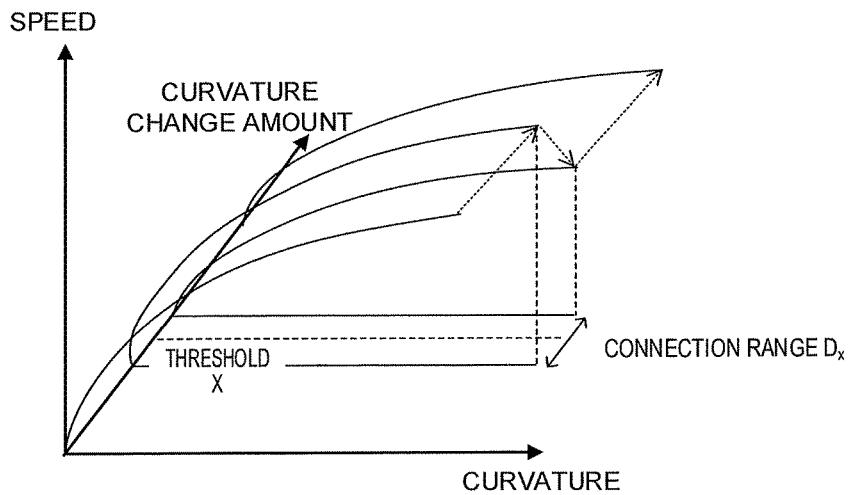

For example, when speed control with the curvature change amount is performed similarly to the first embodiment, as shown in FIG. 5A, a connection range $D_x$ is defined from a first threshold $X-\delta_x$ to a second threshold $X+\delta_x$, and within this range, the inward turning amount is continuously and linearly changed. In this way, as shown in a three-dimensional graph of relation between the curvature, the curvature change amount and the speed in FIG. 5B, continuous speed control is performed on the basis of the curvature change amount when the curvature change amount is within the aforementioned connection range D.

Figure 6A:
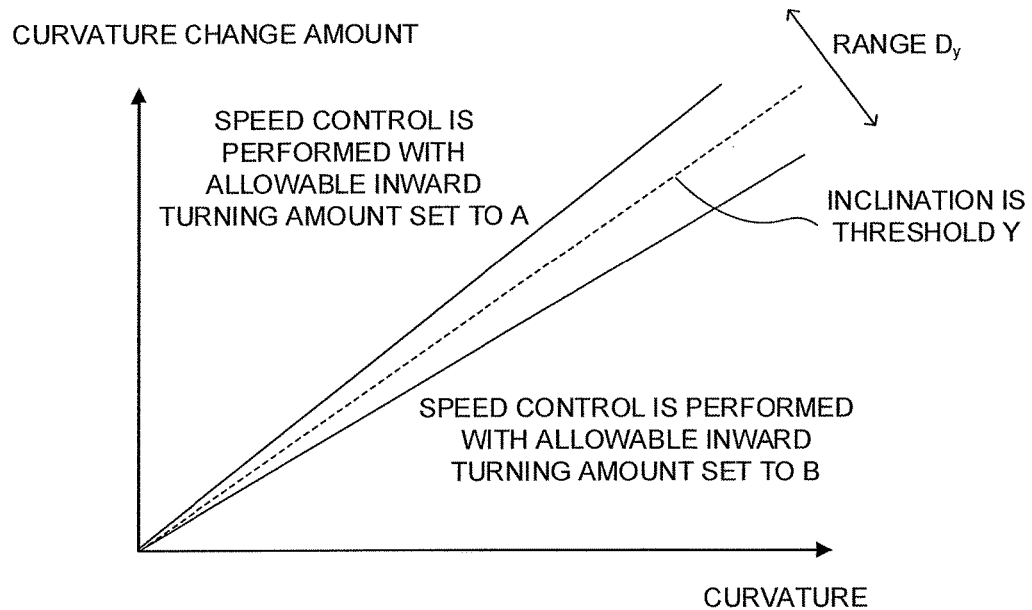
FIGS. 6A and 6B are diagrams for illustrating proper use of the constant values used for speed calculation with the curvature change amount relative to the curvature by the numerical controller according to the third embodiment of the present invention.
Figure 6B:
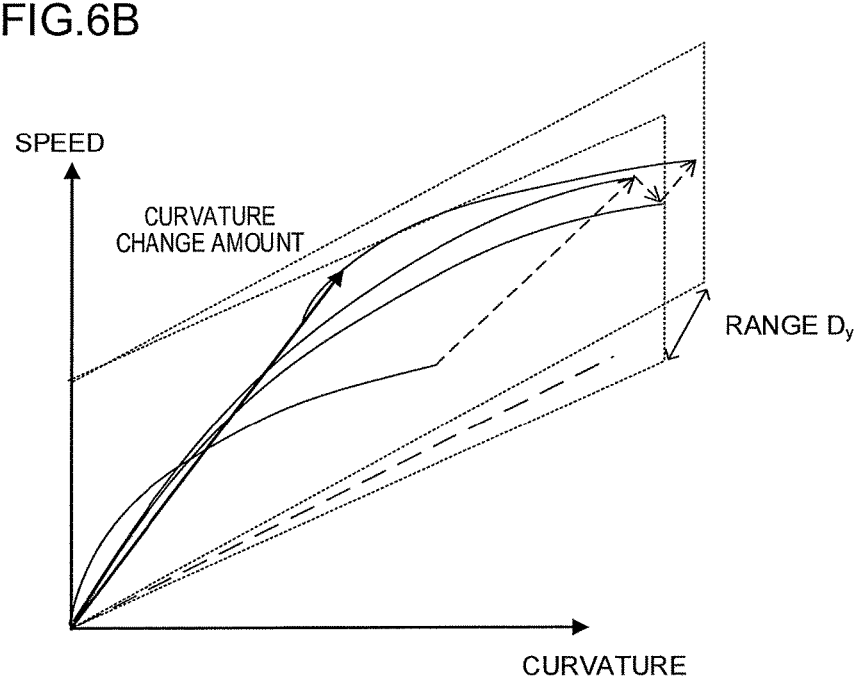
Figure 7:
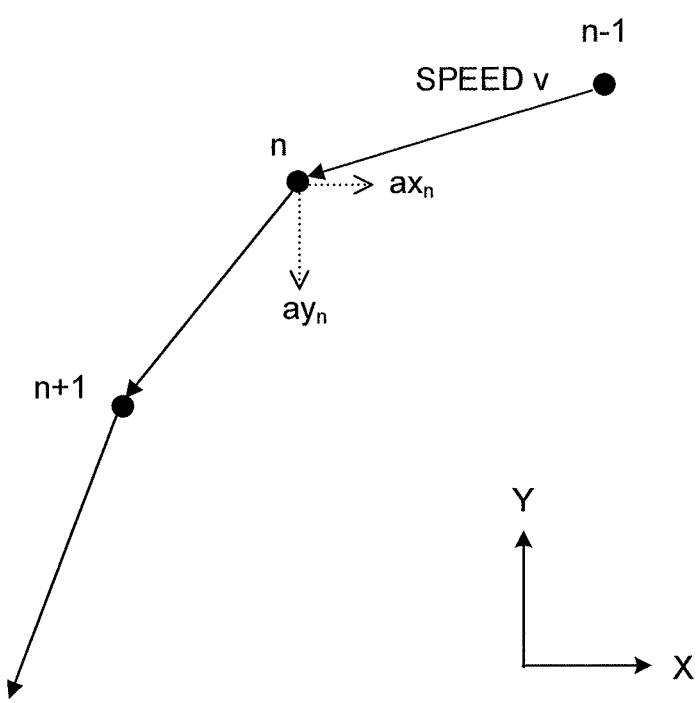
FIG. 7 is a diagram for illustrating limitation of the speed on the basis of allowable accelerations.
Figure 8A:
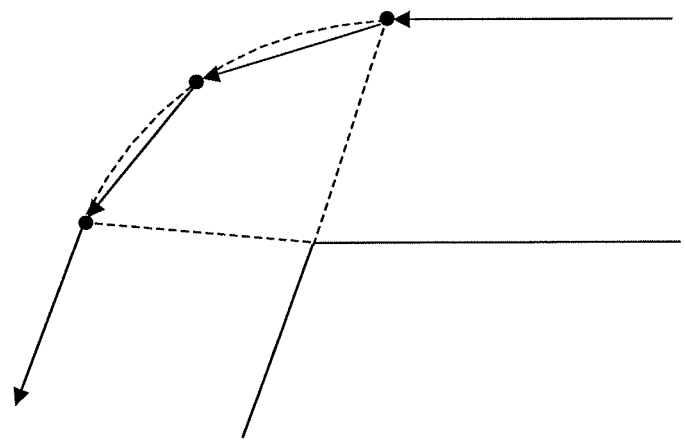
FIGS. 8A and 8B are diagrams showing the cases of machining of the same shapes with the different numbers of instruction points.
Figure 8B:
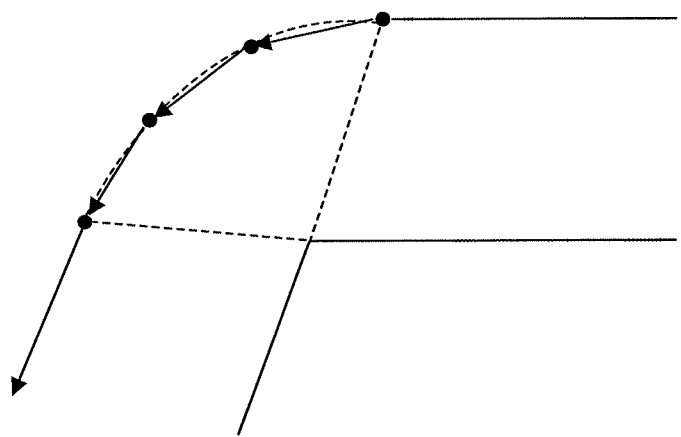

Moreover, also when speed control with the curvature change amount relative to the curvature is performed similarly to the second embodiment, as shown in FIG. 6A, a connection range $D_y$ is defined from a first threshold $Y-\delta_y$ to a second threshold $Y+\delta_y$ of the ratio (inclination) of the curvature change amount to the curvature, and within this range, the inward turning amount is continuously and linearly changed. In this way, as shown in a three-dimensional graph of relation between the curvature, the curvature change amount and the speed in FIG. 6B, continuous speed control is performed on the basis of the curvature change amount when the ratio (inclination) of the curvature change amount relative to the curvature is within the aforementioned connection range $D_y$.

While a functional block diagram of the numerical controller according to the present embodiment is similar to that in FIG. 3 (first and second embodiments), in the present embodiment, the contents of processing performed by the speed control determination unit 11 and the speed calculation unit 12 are different from those in the first and second embodiments.

The speed control determination unit 11 calculates the curvature at the start point of each block on the movement path on the basis of the movement instruction data received from the instruction analysis unit 10, and further calculates the curvature change amount from the curvature of each block and the curvature at the start point of the block previous to this block. Then, it determines how the calculated curvature change amount relates to the connection range $D_x$ when speed control is performed with the calculated curvature change amount. Moreover, the speed control determination unit 11 determines how the ratio of the curvature change amount to the curvature relates to the connection range $D_y$ when speed control is performed with the ratio of the curvature change amount to the curvature.

Then, a constant value of a constant that is used for speed control and is used in the speed calculation unit 12 is set on the basis of the determination result. When setting such a constant value, the inward turning amount is set according to any of the following three cases:

a case where the curvature change amount exceeds the maximum value of the connection range;

a case where the curvature change amount falls within the connection range; and a case where the curvature change amount goes below the minimum value of the connection range.

For example, when the curvature change amount exceeds the maximum value of the curvature change amount within the connection range $D_x$, the constant value of the inward turning amount which is the constant used for speed control is set to be A.

When the curvature change amount goes below the minimum value of the curvature change amount within the connection range $D_x$, the constant value of the inward turning amount which is the constant used for speed control is set to be B.

Figure 5C:
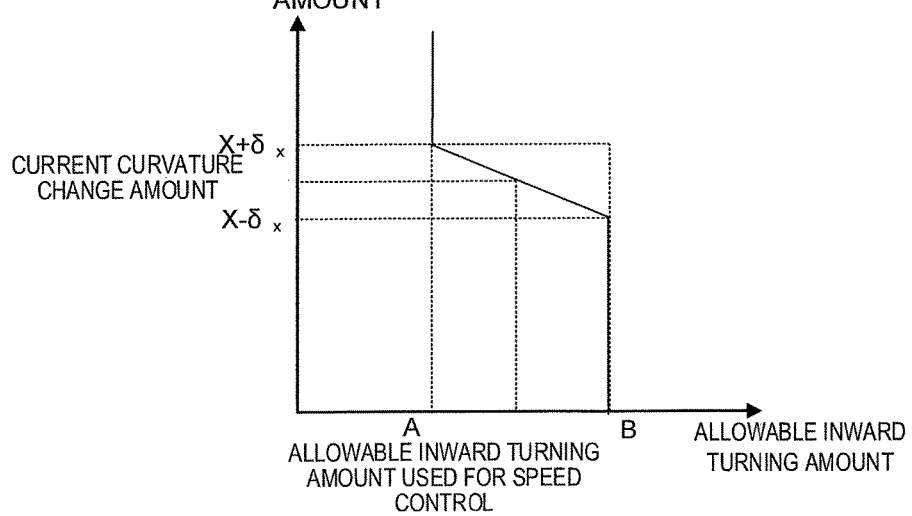

Further, when the curvature change amount is within the connection range $D_x$, as shown in FIG. 5C, the allowable inward turning amount used for speed control is set from the current curvature change amount by performing linear interpolation based on the maximum value of the curvature change amount and the minimum value of the curvature change amount within the connection range $D_x$, and the allowable inward turning amounts A and B.

Meanwhile, the speed calculation unit 12 determines the speed such that the inward turning amount in consideration of post-interpolation acceleration and deceleration is constant. When speed control is performed on the basis of the curvature change amount by using the constant value set by the speed control determination unit 11, the speed is calculated such that the allowable inward turning amount is constant to be A in the case where the curvature change amount exceeds the maximum value of the curvature change amount within the connection range $D_x$, and the speed is calculated such that the allowable inward turning amount is constant to be B in the case where the curvature change amount goes below the minimum value of the curvature change amount within the connection range $D_x$.

Then, in the case where the curvature change amount is within the connection range $D_x$, as shown in FIG. 5C, the allowable inward turning amount used for speed control is obtained from the current curvature change amount by performing linear interpolation based on the maximum value of the curvature change amount and the minimum value of the curvature change amount within the connection range $D_x$, and the allowable inward turning amounts A and B, and the speed is calculated on the basis of the obtained allowable inward turning amount.

Note that also when speed control is performed with the ratio of the curvature change amount to the curvature, the similar calculation only has to be performed with the ratio of the curvature change amount to the curvature, the threshold Y and the connection range $D_y$ being the parameters. Also in the case of using another technique, calculation only has to be performed with the connection range properly set.

The numerical controller 1 of the present embodiment provides similar advantageous effects to that of the first and second embodiments. In addition, in the case of the numerical controller 1 of the present embodiment, influence on machining arising due to switching of the constant value can be suppressed as much as possible since the constant values used for speed calculation are connected to be as continuous as possible so as not to be discontinuous.

As above, embodiments of the present invention have been described. The present invention is not limited to only the aforementioned examples of the embodiments but can be embodied in various modes with proper modifications applied thereto.

For example, while in each of the aforementioned embodiments, the example of switching the allowable inward turning amounts in consideration of post-interpolation acceleration and deceleration is presented as an example of the constant value used for speed control, the present invention can be preferably applied to another constant value used for speed control. Furthermore, while in the third embodiment, the case of linearly connecting the constant values used for speed control is described as an example, another connection technique can also be used as long as the connection is performed such that the constant value is continuously changed.

What is claimed is:

1. A numerical controller which controls, on the basis of a program instruction, a machine that machines a workpiece by driving a plurality of axes to move a tool and the workpiece relative to each other, the apparatus comprising:

an instruction analysis unit that analyzes the program instruction to generate movement instruction data;

a speed control determination unit that sets a value of a constant used for speed change on the basis of a physical amount regarding a curvature at a current position on a movement path based on the movement instruction data; and a speed calculation unit that calculates movement speeds of the axes using the value of a constant used for speed change, which is set by the speed control determination unit, wherein the axes are controlled on the basis of the movement speeds calculated by the speed calculation unit.

2. The numerical controller according to claim 1, wherein the speed control determination unit is configured to set the value of the constant used for the speed change on the basis of a curvature change amount at the current position on the movement path.

3. The numerical controller according to claim 1, wherein the speed control determination unit is configured to set the value of the constant used for the speed change on the basis of relation between the curvature and a curvature change amount at the current position on the movement path.

4. The numerical controller according to claim 1, wherein the speed control determination unit is configured to set the value of the constant used for the speed change such that the constant takes a value continuous with respect to change in value of the physical amount regarding the curvature.

* * * * *